(12) United States Patent
Schweidler et al.

(10) Patent No.: US 6,618,832 B1
(45) Date of Patent: Sep. 9, 2003

(54) METHOD AND BUS INTERFACE EMPLOYING A MEMORY IN AN INTERGRATED CIRCUIT WHICH IS USED TO LINK A BUS WITH AN APPLICATION DEVICE TO BE CONTROLLED BY THE BUS

(75) Inventors: Siegfried Schweidler, Gehrden (DE); Thomas Brune, Hannover (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/515,660

(22) Filed: Feb. 29, 2000

(30) Foreign Application Priority Data

Mar. 6, 1999 (EP) .............................................. 99250067

(51) Int. Cl.$^7$ ............................................. H03M 13/05
(52) U.S. Cl. ........................ 714/776; 370/252; 370/333
(58) Field of Search ................................ 370/241–242, 370/252, 333, 912; 714/755, 776

(56) References Cited

U.S. PATENT DOCUMENTS

| | | | |
|---|---|---|---|
| 5,548,598 A | | 8/1996 | Dupont |
| 5,991,912 A | * | 11/1999 | Mao ............................ 714/776 |
| 6,105,160 A | * | 8/2000 | Fukumoto et al. ........... 714/776 |
| 6,263,466 B1 | * | 7/2001 | Hinedi et al. ................ 714/755 |
| 6,434,718 B1 | * | 8/2002 | Kawahara et al. ........... 714/774 |

FOREIGN PATENT DOCUMENTS

EP          0804033 A2      10/1997      ............. H04N/7/24

OTHER PUBLICATIONS

Banks, David et al. Breaking Open the Set Top Box Nov. 11, 1997 HP Labs Technical Report HPL–97–139, pp. 1–12.*
R.H.J. Bloks, 'The IEE–1394 High Speed Serial Bus' 1996, pp. 209–216, Phillips Journal of Research vol. 50, Netherlands.
European Search Report, EP Appln No. 99250067.

* cited by examiner

Primary Examiner—R. Stephen Dildine
(74) Attorney, Agent, or Firm—Joseph S. Tripoli; Paul P. Kiel

(57) ABSTRACT

The IEEE1394 bus communication protocol has three layers: physical layer, link layer, and transaction layer. A link layer IC implements the interface to an external application and prepares data for sending on the bus, or interprets incoming data packets from the IEEE1394 bus. A physical layer IC implements the direct electrical connection to the bus and controls many functions including arbitration for sending data on the bus. According to the invention the capacity of the on-chip memory becomes assigned in a flexible way in order to be able to meet the requirements for any specific service. Further, the on-chip memory is prevented from storing data packets containing transmission errors by CRC checking on the fly header data and other data. This is performed for asynchronous data packets as well as isochronous data packets, and allows to have a minimum on-chip memory capacity only.

8 Claims, 2 Drawing Sheets

METHOD AND BUS INTERFACE EMPLOYING A MEMORY IN AN INTERGRATED CIRCUIT WHICH IS USED TO LINK A BUS WITH AN APPLICATION DEVICE TO BE CONTROLLED BY THE BUS

FIELD OF THE INVENTION

The present invention relates to a method and to a bus interface employing a memory in an integrated circuit which is used to link a bus with an application device to be controlled by the bus.

BACKGROUND OF THE INVENTION

The IEEE1394 bus is a low cost, high performance serial bus. It has a read/write memory architecture and a highly sophisticated communication protocol. Data rates of 100, 200 or 400 Mbit/s can be transmitted in nearly real time. Simultaneously, data can be transmitted bi-directionally. The first ten bits of transmitted address values refer to one of up to 1023 possible IEEE1394 bus clusters. The following six bits of the transmitted address values refer within a specific cluster to one of up to 63 nodes to which an application or device is assigned. Data between nodes can be exchanged without interaction of a host controller. Devices can be connected to or disrupted from the network at any time, allowing a plug and play behaviour.

The standardised cable connection for the nodes has a length of 4.5 m and contains three twisted cable pairs of which two pairs serve for data and control information transmission and the further pair carries supply voltages of 8V to 40V. Three level coding is used: HIGH (H), LOW (L), and HIGH IMPEDANCE (Z). H overrides L, L overrides Z. The characteristic impedance is 110 Ω. There is also a version IEEE1394-1995 of the bus specification including only two twisted pairs of cables on which no power supply voltage is present. The communication protocol has three layers: physical layer, link layer, and transaction layer. Typically, the transaction layer is realised by firmware whereas the other layers are implemented using chip sets.

The physical layer contains analog transceivers and a digital state machine. It handles bus auto-configuration and hot plug. It reclocks, regenerates and repeats all packets and forwards all packets to the local link layer. It carries out-packet framing, for example speed code, prefix, and packet end assembling. It arbitrates and transmits packets from the local link layer. Available IC types are e.g. TSB11C01, TSB11LV01, TSB21LV03, and TSB41LV03 of Texas Instruments, MB86611 of Fujitsu, and 21S750 of IBM.

The link layer performs all digital logic. It recognises packets addressed to the node by address recognition and decodes the packet headers. It delivers packets to higher layers and generates packets from higher layers. It works either isochronous for AV data use or asynchronous for control data use.

In the isochronous mode a channel having a guaranteed bandwidth is established. There is a defined latency. The transmission is performed in 125 μs time slots or cycles. Headers and data blocks of a packet have separate CRCs (cyclic redundancy check). This mode has a higher priority than the asynchronous data transfer mode.

The asynchronous mode is not time critical, but safe. It operates as an acknowledged service with a busy and retry protocol. Fixed addresses are used. Transmission takes place when the bus is idle. The asynchronous mode handles read request/response, write request/response, and lock request/response. It performs cycle control, CRC generation and validation. Available link layer IC types are e.g. TSB12C01A, TSB12LV21, TSB12LV31, and TSB12LV41 of Texas Instruments, and PDI1394L11 of Philips.

The transaction layer implements asynchronous bus transactions:

Read request/read response

Write request/write response

Lock request/lock response.

As mentioned above it can be implemented by software running on a microcontroller, such as e.g. the i960 of SparcLite. There may also be an AV (audio video) layer carrying out device control, connection management, timestamping, and packetising.

In IEEE1394 systems, the link layer acts as an interface between an external application and the IEEE1394 bus (through the physical layer).

The external application can be for example a consumer device, such as a set-top-box or a VCR or a DVD player, which delivers/receives latency critical isochronous data and non-latency critical asynchronous data.

The asynchronous data packets are used for the controlling operations or register read/write/lock operations. Isochronous data packets contain information items like video-/audio data.

SUMMARY OF THE INVENTION

For timing decoupling of IEEE1394 bus and application an on-chip memory is used. Because of strongly limited link layer IC on-chip memory capacity it is important to save space when processing with this memory. In case of an ASIC solution for the link layer IC a FIFO (first-in first-out memory) can be used to connect the IEEE1394 bus with the application device and to organise the handling of the asynchronous and isochronous data packets.

It is possible to separate the memory capacity into fixed areas for asynchronous and isochronous data. However, it is advantageous to split the memory capacity in a flexible way in order to be able to meet the requirements for any specific service. Then the memory capacity remaining for other services is to be managed efficiently in order to meet the speed and address requirements. One problem is the efficient management of latency critical isochronous data and non-latency critical asynchronous data within the on-chip memory.

According to the invention, the on-chip memory is prevented on the fly from storing packets containing transmission errors. This feature is true for all asynchronous data packets and in special cases also for isochronous data packets.

In particular, the FIFO memory of the link layer chip is separated into three areas: asynchronous reception area, asynchronous transmission area and isochronous data packet area.

In the asynchronous mode the reception and transmission of IEEE1394 bus data packets is performed in an independent way, whereas in the isochronous mode the reception and transmission of a data packet is carried out in a sequential way, thereby accessing the same memory area.

In receiving mode the data packets coming from the IEEE1394 bus are written word by word into the corresponding memory area. According to the IEEE1394 bus specification the first part of a data packet is defined as the packet-header which is followed by the packet (user) data in the second part.

There are two CRC checkwords (cyclic redundancy check) in an asynchronous IEEE1394 data packet. The first one is appended to the packet header and the second one is appended to the packet or payload data. Due to this specific location of the CRC checkwords within the received packet datastream it is not possible to process the CRC checkwords before writing a data packet into memory. There are at least three ways to process an asynchronous data packet:

a) write all data packet completely into the memory without CRC check. Upon reading the data packets from the memory, the application device will carry out the header CRC check and the packet data CRC check on all data packets and skip the erroneous data packets;

b) in each case, write a complete data packet into the memory thereby carrying out immediate CRC check on this data packet and mark it as 'erroneous' if true for the header CRC check and/or the packet data CRC check. Upon reading the data packets from the memory, the application device will check the marking of all data packets and skip the erroneous data packets;

c) in each case, carry out 'on-the-fly' a header CRC check or a header CRC check and a packet data CRC check on the incoming data packet using a dedicated CRC check unit and its register(s), and do not write the incoming data packet or its packet data into the memory if the header and/or the packet data is erroneous. Then, initialised by the first header data byte, overwrite the erroneous data packet or packet data, respectively, with the next incoming data packet or packet data.

Advantageously, alternative c) is performed because it saves as much memory space as possible.

Isochronous data packets have a similar structure. The packet header is followed by a header CRC checkword which itself is followed by a payload data field to which a data CRC checkword is attached. This payload field, or data field, contains at the beginning an information field denoted common isochronous packet (CIP) header, describing the structure of the following data. This item of information is not necessarily written into the memory.

Source data packets may contain data groups which have a pre-known fixed data length which does not match the data length of the IEEE1394 payload data field. E.g. MPEG transport packets do have a standardised length of 188 bytes which is different from the length of 104 bytes of the IEEE1394 payload data field. Therefore one MPEG transport packet can be transmitted partially within one, two, four or eight succeeding IEEE1394 payload data fields.

There are at least six ways to process an isochronous data packet:

d) in each case, if a data packet is recognised to be addressed to the application device, write it completely into the memory without header CRC check and data field CRC check. Upon reading the data packets from the memory, the application device will carry out both types of CRC checks on all data packets and skip the erroneous data packets;

e) in each case, write a complete data packet into the memory, carry out immediate header CRC check and/or data field CRC check on this data packet and mark it as 'erroneous' if true for the header and/or the data field. Upon reading the data packets from the memory, the application device will check the markings of all data packets and skip the erroneous headers and/or data fields. In some cases it may be possible that one part of a data packet can be used although the other part is erroneous;

f) in each case, carry out 'on-the-fly' a header CRC check on the incoming data packet using a dedicated CRC check unit and its register(s). Do not write the incoming data packet into the memory if the header is erroneous. Other-wise, either evaluate the header directly and write the data field into the memory including the data field CRC, or write the header and the data field into the memory including the data field CRC. Data field CRC check is performed later;

g) in each case, carry out 'on-the-fly' a header CRC check on the incoming data packet using a dedicated CRC check unit and its register(s). Do not write the incoming data packet into the memory if the header is erroneous. Other-wise, either evaluate the header directly and write the data field into the memory including the data CRC thereby performing data field CRC check, or write the header and the data field into the memory thereby performing data field CRC check, and mark the data field as 'erroneous' if true. The marking can be stored in the memory together with the data field. Upon reading the payload data field, or the header and the payload data field, from the memory the application device will check the marking and skip the erroneous payload data fields or headers, respectively;

h) in each case, carry out 'on-the-fly' a header CRC check and a data field CRC check on the incoming data packet using a dedicated CRC check unit and its register(s). Do not write the incoming data packet into the memory if the header and/or the data field is erroneous;

i) in each case, carry out 'on-the-fly' a header CRC check on the incoming data packet using a dedicated CRC check unit and its register(s). Do not write the incoming data packet into the memory if the header is erroneous. Other-wise, either evaluate the header directly and write the source packet data from the data field into the memory thereby performing data field CRC check, or write the header and the data field into the memory thereby per-forming data field CRC check, and mark source packet data or the data field, respectively, as 'erroneous' if true. In addition, the above described data length is checked. In case the pre-known data length of a source packet is not achieved, this source packet can be marked as 'erroneous'. That packet will be overwritten by the next packet. Upon reading the header and the payload data field from the memory the application device will check the marking and skip the erroneous payload data fields or headers, respectively.

Advantageously, alternative i) is performed because it saves as much memory space as possible and because it allows to not only detect transmission errors but also source packet generation errors.

It is one object of the invention to disclose a method for employing a memory in an integrated circuit which is used to link a bus with an application device to be controlled by said bus, wherein the required memory capacity is minimised.

It is a further object of the invention to disclose an apparatus which utilises the inventive method.

In principle, the inventive method employs a memory in an integrated circuit which is used to link a bus with an application device to be controlled by said bus, wherein data packets are sent via said bus to said application device which include header data to which a first error protection code is assigned and payload data to which a second error protection code is assigned, and wherein said payload data are intended to be intermediately stored in said memory, and wherein for a received current data packet in each case said first error protection code is evaluated and if this evaluation indicates that the header data of the current data packet have been received erroneously, at least payload data of the current data packet are not written into said memory. In case header data of said current data packet have been written into said memory and the evaluation of said first error protection code or said second error protection code, respectively, indicates that the header data resp. payload data of the current data packet have been received erroneously, the header data of the next data packet to be received can overwrite the header data of the current data packet in said memory.

In principle the inventive bus interface is suited for linking a bus with an application device to be controlled by said bus, wherein data packets are sent via said bus to said application device which include header data to which a first error protection code is assigned and payload data to which a second error protection code is assigned, and includes:

a memory in an integrated circuit into which said payload data are intended to be intermediately stored;

evaluation means which in each case evaluate said first error protection code of a received current data packet, wherein, if the evaluation result indicates that the header data of the current data packet have been received erroneously, at least payload data of the current data packet are not written into said memory.

In case header data of said current data packet have been written into said memory and the result from said evaluation means concerning said first error protection code or said second error protection code, respectively, indicates that the header data resp. payload data of the current data packet have been received erroneously, memory address generation means can control said memory such that the header data of the next data packet to be received overwrite the header data of the current data packet.

BRIEF DESCRIPTION OF THE DRAWINGS

Embodiments of the invention are described with reference to the accompanying drawings, which show in.

DETAILED DESCRIPTION OF PREFERRED EMBODIMENTS

Figure 1:
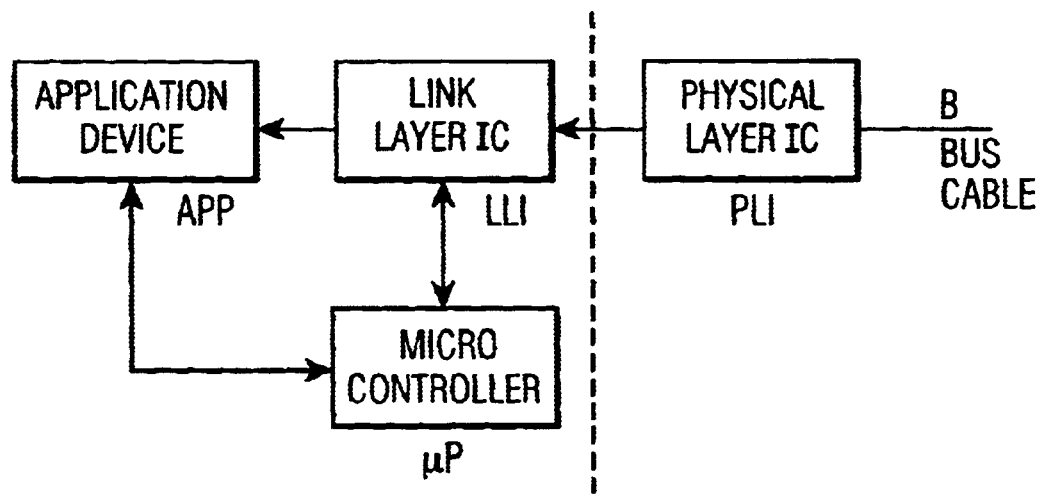
FIG. 1 IEEE1394 double-node for bi-directional real-time video applications.

In FIG. 1 a physical layer IC PLI is connected to an IEEE1394 bus cable B. PLI is at the other side assigned to a link layer IC LLI for data input and/or data output. LLI is assigned to an application device APP. LLI and PLI via LLI are controlled by a microcontroller μP. Application device APP can also be controlled by μP. Alternatively, PLI and/or APP can be controlled by a separate microcontroller. μP can carry out the above described CRC checks.

Figure 2:
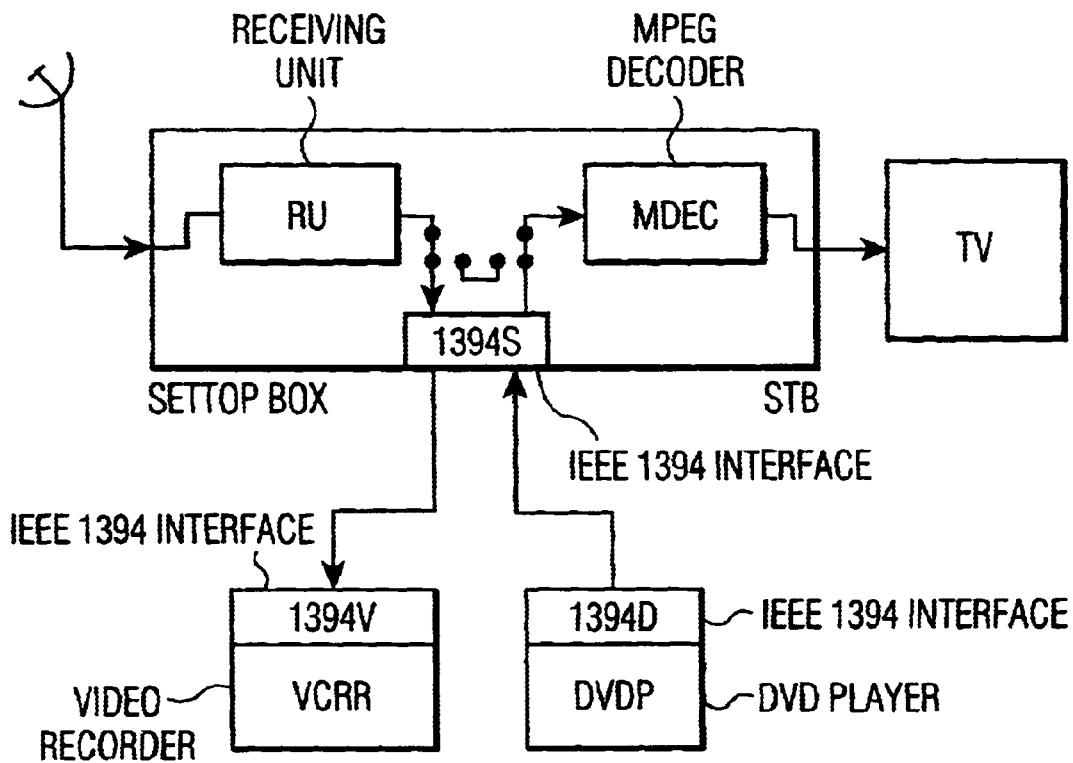
FIG. 2 an IEEE1394 bus-connected set-top box, VCR and DVD player.

The invention can e.g. be used for an application as depicted in FIG. 2: A set-top box STB with receiving unit RU, MPEG decoder MDEC and IEEE1394 interface 1394S receives a digital TV program via satellite or cable. The receiving unit output signal is transmitted via IEEE1394 bus for the purpose of recording to a video recorder VCRR including also a IEEE1394 interface 1394V. Simultaneously, a DVD player DVDP replays a DVD disc and the DVD data is also transported via an IEEE1394 bus interface 1394D to the IEEE1394 bus interface 1394S of the set-top box in order to be decoded by the MPEG decoder MDEC and to be displayed on the screen of a television receiver TV. TV may still have an analog signal connection to the set-top box, but may also be connected to STB by an IEEE1394 bus interface. So, the set-top box IEEE1394 bus node 1394S needs a bi-directional functionality.

Figure 3:
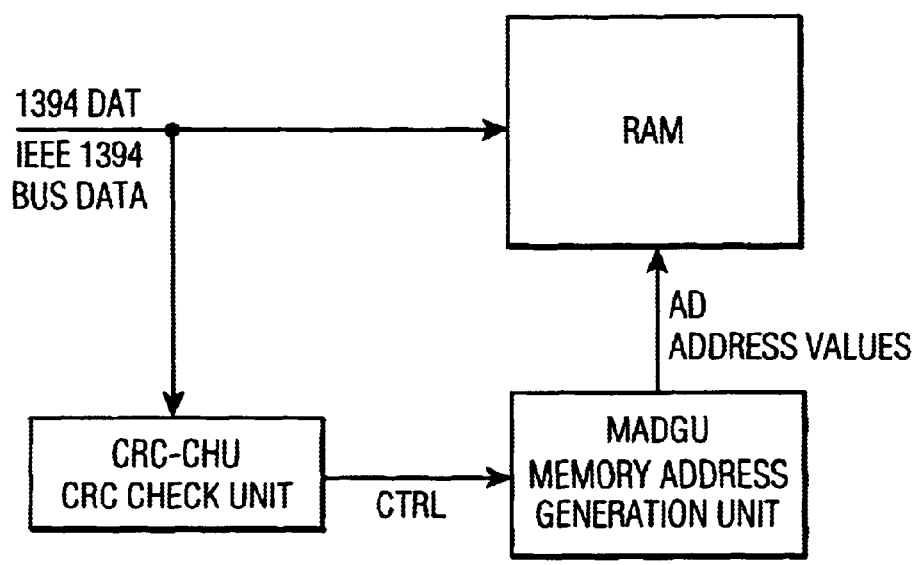
FIG. 3 a CRC checking unit which controls addresses of the on-chip memory.

In FIG. 3 a CRC check unit CRC_CHU and an on-chip memory RAM are provided with IEEE1394 bus data 1394DAT. This memory stores asynchronous or isochronous packet data. After CRC check, CRC_CHU sends, according to the CRC check result, corresponding control information CTRL to a memory address generation unit MADGU. MADGU provides memory RAM with corresponding address values which serve to e.g. overwrite an already stored erroneous data packet.

Figures 4, 5:
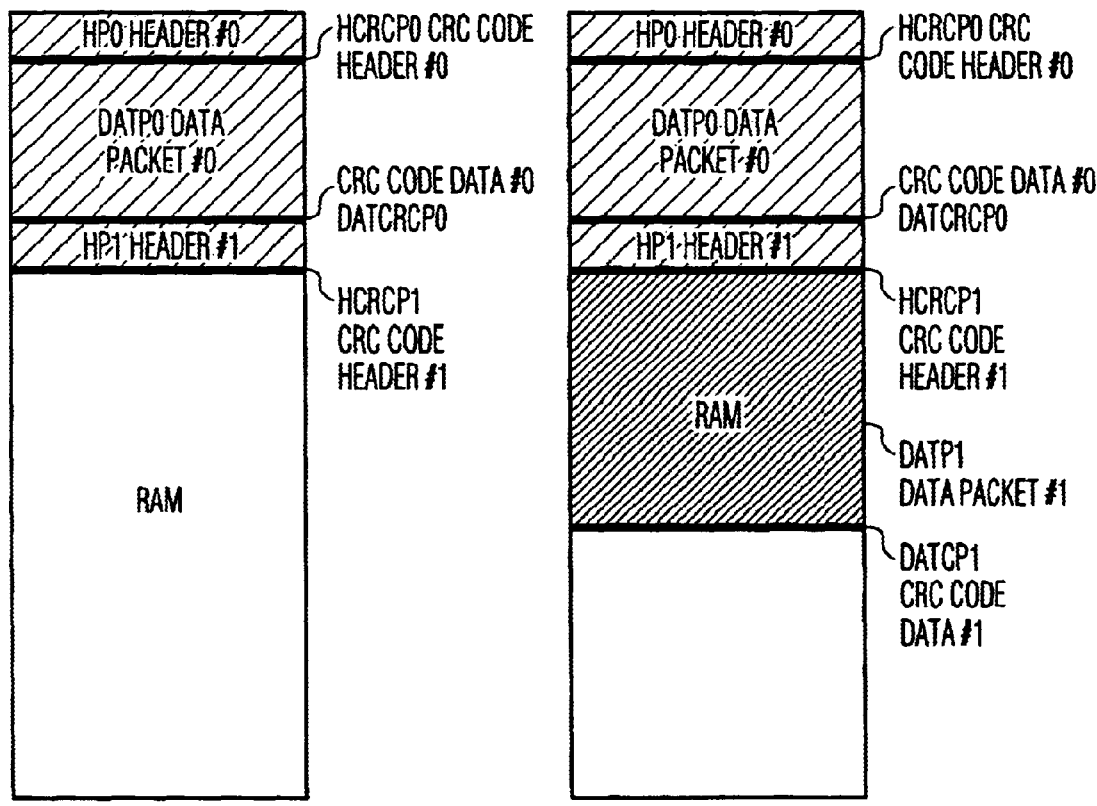
FIG. 4 on-chip memory having stored a first amount of data before previously stored data are overwritten.
FIG. 5 on-chip memory having stored a second amount of data before previously stored data are overwritten.

FIG. 4 depicts content of memory RAM in connection with header and data CRC checking. As an example, RAM contains:

the header HP0 of packet #0;

the CRC code HCRCP0 for this header, the status of which is 'ok', i.e. the header data have been received error-free;

the data DATP0 of packet #0;

CRC code DATCRCP0 for the data of this packet, the status of which is 'ok', i.e. the data have been received error-free;

the header HP1 of packet #1;

CRC code HCRCP1 for this header, the status of which is 'fault', i.e. erroneous header data have been received. As a result, the data of packet #1 are not written into RAM and HCRCP1 will be overwritten by the header data of packet #2.

FIG. 5 depicts content of memory RAM in connection with header and data CRC checking. As an example, RAM contains:

the header HP0 of packet #0;

CRC code HCRCP0 for this header, the status of which is 'ok', i.e. the header data have been received error-free;

the data DATP0 of packet #0;

CRC code DATCRCP0 for the data of this packet, the status of which is 'ok', i.e. the data have been received error-free;

the header HP1 of packet #1;

CRC code HCRCP1 for this header, the status of which is 'ok', i.e. the header data have been received error-free;

the data DATP1 of packet #1;

CRC code DATCRCP1 for the data of this packet, the status of which is 'fault', i.e. erroneous data have been received. As a result, the header data of packet #2 are not written after DATCRCP1 into RAM but will overwrite the header data HP1 of packet #1, controlled by MADGU.

In case error-free header data are not written into the memory they are evaluated before and/or during corresponding payload data are written into the memory.

The invention offers the following advantages for asynchronous data packet reception:

no processing power of the application device is required because the CRC checks can be performed by a dedicated CRC check unit on the chip;

the on-chip memory utilisation is optimum because erroneous packet data become overwritten.

The invention offers the following advantages for isochronous data packet reception:

no processing power of the application device is required because the CRC checks can be performed by a dedicated CRC check unit on the chip;

the application device can decide to make use of data packets with data field CRC errors but correct packet length, e.g. in order to keep synchronised audio/video data which have a fixed temporal location to each other;

this decision is software controllable;

the on-chip memory utilisation is optimum because erroneous packet data become overwritten.

Instead of an IEEE1394 bus any other bus like Ethernet or Internet can be used. Instead of the CRC error protection code any other error protection code like e.g. Reed Solomon or parity bits can be used.

What is claimed is:

1. Method for employing a memory in an integrated circuit which is used to link a bus with an application device to be controlled by said bus, including the steps:

sending asynchronous or isochronous data packets via said bus to said application device which data packets include header data to which a first error protection code is assigned and payload data to which a second error protection code is assigned, wherein said payload data are intended to be intermediately stored in said memory;

evaluating in each case for a received current data packet said first error protection code, wherein, if this evaluation indicates that the header data of the current data packet have been received erroneously, at least payload data of the current data packet are not written into said memory; and overwriting the header data of the current data packet in said memory with the header data of the next data packet to be received, if header data of said current data packet have been written previously into said memory and the evaluation of said first error protection code or said second error protection code, respectively, indicates that the header data resp. payload data of the current data packet have been received erroneously.

2. Method according to claim 1, wherein said bus is an IEEE1394 bus.

3. Method according to claim 1, wherein in case of asynchronous data packets the overwriting in said memory is initialised by the first header data byte.

4. Method according to claim 1, wherein in case of isochronous data packets and data groups in the data packets having a pre-known data length and wherein, in case the actual data length of a data group received does not match said pre-known data length, the header data resp. payload data of the next data packet to be received will also overwrite the header data resp. payload data of the current data packet in said memory.

5. Method according to claim 1, wherein error-free header data are not written into said memory but are evaluated before corresponding payload data are written into said memory and/or during the time that corresponding payload data are written into said memory.

6. Method according to claim 1, wherein before and/or during payload data of a current data packet are written into said memory, said second error protection code is evaluated, and wherein the payload data of said current data packet are marked as 'erroneous' if true and wherein that marking is stored in the memory together with the payload data.

7. Bus interface for linking a bus with an application device to be controlled by said bus, wherein asynchronous or isochronous data packets are sent via said bus to said application device which include header data to which a first error protection code is assigned and payload data to which a second error protection code is assigned, including:

a memory in an integrated circuit into which said payload data are intended to be intermediately stored;

evaluation means which in each case evaluate said first error protection code of a received current data packet, wherein, if the evaluation result indicates that the header data of the current data packet have been received erroneously, at least payload data of the current data packet are not written into said memory, and wherein in case header data of said current data packet have been written into said memory and the result from said evaluation means concerning said first error protection code or said second error protection code, respectively, indicates that the header data resp. payload data of the current data packet have been received erroneously, memory address generation means control said memory such that the header data of the next data packet to be received overwrite the header data of the current data packet.

8. Bus interface according to claim 7, wherein said bus is an IEEE1394 bus.

* * * * *